(12) United States Patent
Katoh et al.

(10) Patent No.: US 8,276,367 B2
(45) Date of Patent: Oct. 2, 2012

(54) EXHAUST GAS CONTROL APPARATUS AND METHOD FOR AN INTERNAL COMBUSTION ENGINE

(75) Inventors: Kenji Katoh, Suntou-gun (JP); Kei Masuda, Mishima (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 858 days.

(21) Appl. No.: 12/441,543

(22) PCT Filed: Dec. 21, 2007

(86) PCT No.: PCT/IB2007/004051
§ 371 (c)(1),
(2), (4) Date: Mar. 17, 2009

(87) PCT Pub. No.: WO2008/081286
PCT Pub. Date: Jul. 10, 2008

(65) Prior Publication Data
US 2009/0277160 A1    Nov. 12, 2009

(30) Foreign Application Priority Data
Dec. 21, 2006 (JP) .................................. 2006-344231

(51) Int. Cl.
*F01N 3/00* (2006.01)
(52) U.S. Cl. ............... 60/286; 60/274; 60/285; 60/301; 60/303
(58) Field of Classification Search .................... 60/274, 60/285, 286, 295, 297, 301, 303
See application file for complete search history.

(56) References Cited

U.S. PATENT DOCUMENTS

| | | | |
|---|---|---|---|
| 5,953,907 A | 9/1999 | Kato et al. | |
| 6,195,987 B1 * | 3/2001 | Miyashita | 60/285 |
| 6,345,496 B1 * | 2/2002 | Fuwa et al. | 60/274 |
| 6,718,756 B1 | 4/2004 | Okada et al. | |
| 6,725,651 B2 * | 4/2004 | Itoh et al. | 60/286 |
| 6,976,356 B2 * | 12/2005 | Okada et al. | 60/286 |
| 7,047,726 B2 * | 5/2006 | Katoh et al. | 60/274 |
| 7,454,900 B2 * | 11/2008 | Hayashi | 60/295 |
| 7,892,508 B2 * | 2/2011 | Katoh | 423/213.2 |
| 2006/0112681 A1 | 6/2006 | Nakayama et al. | |

FOREIGN PATENT DOCUMENTS

| | | |
|---|---|---|
| JP | 10 47041 | 2/1998 |
| JP | 2004 84617 | 3/2004 |
| JP | 2004 517249 | 6/2004 |
| JP | 2004 218475 | 8/2004 |
| JP | 2005 214098 | 8/2005 |
| JP | 2006 177313 | 7/2006 |
| WO | 00 43647 | 7/2000 |

* cited by examiner

*Primary Examiner* — Binh Q Tran
(74) *Attorney, Agent, or Firm* — Oblon, Spivak, McClelland, Maier & Neustadt, L.L.P.

(57) ABSTRACT

An exhaust gas control apparatus for an internal combustion engine, including a three-way catalyst, a $NO_X$ storage-reduction catalyst, a rich controlling mechanism performing control to make an air-fuel ratio of exhaust gas rich to reduce $NO_X$ stored in the $NO_X$ storage-reduction catalyst, and a control performing control to ensure that a $NO_X$ purifying component is present in the $NO_X$ storage-reduction catalyst when reducing the $NO_X$.

17 Claims, 11 Drawing Sheets

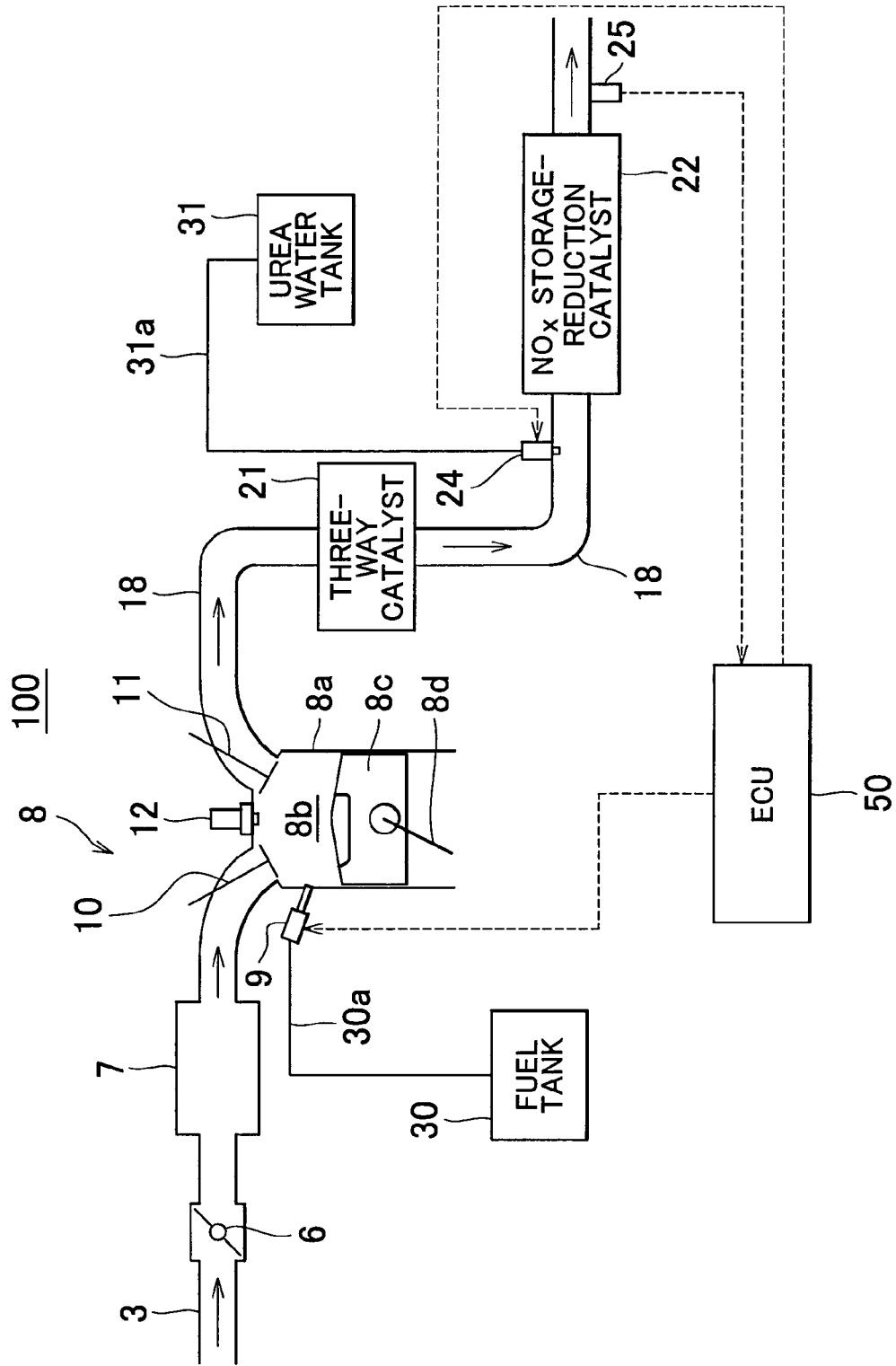

EXHAUST GAS CONTROL APPARATUS AND METHOD FOR AN INTERNAL COMBUSTION ENGINE

BACKGROUND OF THE INVENTION

1. Field of the Invention

The invention relates to an exhaust gas control apparatus and method for an internal combustion engine, which purifies exhaust gas using a $NO_X$ storage-reduction catalyst.

2. Description of the Related Art

An exhaust gas control apparatus has been proposed which purifies $NO_X$ in exhaust gas using a $NO_X$ storage-reduction catalyst provided in an exhaust passage. For example, Japanese Patent Application Publication No. JP-A-2004-84617 describes technology that executes rich spike control (hereinafter also referred to as "RS control") which makes the air-fuel ratio rich in order to reduce $NO_X$ stored in the $NO_X$ storage-reduction catalyst.

In addition, technology has also been proposed to purify $NO_X$ in the exhaust gas using ammonia ($NH_3$). Japanese Patent Application Publication No. JP-A-10-47041 describes technology in which a $NO_X$ storage-reduction catalyst is arranged in some of the exhaust ports. $NH_3$ is produced by making the air-fuel ratio of the exhaust gas in the cylinders upstream of the $NO_X$ storage-reduction catalyst rich and is used to purify $NO_X$ discharged from the other cylinders in the downstream exhaust gas control catalyst. Also, Japanese Patent Application Publication No. JP-A-2004-218475 describes technology which improves $NO_X$ purifying performance in both low and high temperature regions by providing a $NO_X$ selective reduction catalyst upstream of a $NO_X$ storage-reduction catalyst and adding urea into the exhaust passage. In addition, Japanese Patent Application Publication No. JP-A-2005-214098 describes technology that produces $NH_3$ by making the air-fuel ratio of the exhaust gas at the $NO_X$ catalyst portion rich and purifies $NO_X$ using that $NH_3$ during lean burn operation.

However, with the technology described in the Japanese Patent Application Publication No. JP-A-2004-84617, there were cases in which $NO_X$ components leaked out from the $NO_X$ storage-reduction catalyst (hereinafter this may also be referred to as simply "$NO_X$ leakage") in the initial stage of RS control. Such $NO_X$ leakage is thought to occur when reducing agent components such as HC, CO, and $H_2$ are consumed by oxygen or the like such that exhaust gas with an insufficient amount of the reducing agent is supplied to the $NO_X$ storage-reduction catalyst. Also, with the technologies described in the Japanese Patent Application Publications No. JP-A-10-47041, JP-A-2004-218475, and JP-A-2005-214098, as well, it was difficult to appropriately suppress such $NO_X$ leakage from the $NO_X$ storage-reduction catalyst when reducing $NO_X$ therein.

SUMMARY OF THE INVENTION

This invention thus provides an exhaust gas control apparatus and exhaust gas control method for an internal combustion engine, which are capable of suppressing $NO_X$ leakage that may occur during $NO_X$ reduction, by appropriately executing rich spike control and control to ensure that a $NO_X$ purifying component is present in the $NO_X$ storage-reduction catalyst.

A first aspect of the invention relates to an exhaust gas control apparatus for an internal combustion engine, which has a three-way catalyst and a $NO_X$ storage-reduction catalyst downstream of the three-way catalyst in an exhaust passage. This exhaust gas control apparatus includes rich controlling means for performing control to make an air-fuel ratio of exhaust gas from a combustion chamber of the internal combustion engine rich to reduce $NO_X$ stored in the $NO_X$ storage-reduction catalyst, and controlling means for performing control to ensure that a $NO_X$ purifying component capable of purifying the $NO_X$ is present in the $NO_X$ storage-reduction catalyst when reducing the $NO_X$.

This exhaust gas control apparatus for an internal combustion engine is preferably used to purify exhaust gas using the three-way catalyst and the $NO_X$ storage-reduction catalyst. More specifically, the rich controlling means performs control to make the air-fuel ratio of the exhaust gas rich to reduce the $NO_X$ stored in the $NO_X$ storage-reduction catalyst. Also, the controlling means performs control to ensure that a $NO_X$ purifying component is present in the $NO_X$ storage-reduction catalyst when reducing the $NO_X$. As a result, it is possible to appropriately perform $NO_X$ reduction in the $NO_X$ storage-reduction catalyst while efficiently suppressing $NO_X$ from leaking out of the $NO_X$ storage-reduction catalyst, which may occur during the initial stage of the control to make the air-fuel ratio of the exhaust gas rich.

In the foregoing structure, the $NO_X$ purifying component may be ammonia. In this case, reducing NO and $NO_2$ and the like to nitrogen, which is harmless, using ammonia enables the discharge of NO and $NO_2$ and the like to be suppressed. Also, the controlling means may include injection controlling means for injecting at least one of urea, ammonia, and fuel into the exhaust passage to ensure that the $NO_X$ purifying component is present in the $NO_X$ storage-reduction catalyst. Incidentally, the injection controlling means may perform the injection into the exhaust passage between the three-way catalyst and the $NO_X$ storage-reduction catalyst.

In the foregoing structure, the injection controlling means may start the injection a first predetermined period of time before a reducing agent produced by making the air-fuel ratio rich reaches the $NO_X$ storage-reduction catalyst. This makes it possible to suppress $NO_X$ from leaking out of the $NO_X$ storage-reduction catalyst.

In the foregoing structure, the first predetermined period of time may be set based on a timing at which the injection should be started to ensure that the $NO_X$ purifying component is present in the $NO_X$ storage-reduction catalyst before the reducing agent reaches the $NO_X$ storage-reduction catalyst.

In the foregoing structure, the injection controlling means may end the injection a second predetermined period of time before the control by the rich controlling means ends.

According to the foregoing structure, the injection controlling means ends the injection control before the control by the rich controlling means ends. This is because a sufficient amount of the reducing agent is supplied to the $NO_X$ storage-reduction catalyst once the control by the rich controlling means has been performed for a certain amount of time. Ending the injection in this way makes it possible to prevent the $NO_X$ purifying component from leaking out of the $NO_X$ storage-reduction catalyst.

In the foregoing structure, the second predetermined period of time may be set based on a timing at which enough of the reducing agent, which is produced by making the air-fuel ratio rich, to reduce the $NO_X$ is supplied to the $NO_X$ storage-reduction catalyst.

In the foregoing structure, the exhaust gas control apparatus may also include $NO_X$ purifying component concentration obtaining means for obtaining a concentration of the $NO_X$ purifying component in the exhaust gas downstream of the $NO_X$ storage-reduction catalyst, and the injection controlling means may end the injection when the concentration of the $NO_X$ purifying component starts to rise.

According to the foregoing structure, the injection controlling means ends the injection when the concentration of the $NO_X$ purifying component downstream of the $NO_X$ storage-reduction catalyst starts to rise. This makes it possible to more reliably prevent the $NO_X$ purifying component from leaking out of the $NO_X$ storage-reduction catalyst.

In the foregoing structure, the rich controlling means may end the control to make the air-fuel ratio of the exhaust gas rich when the injection controlling means ends the injection. In this case, it is conceivable that $NO_X$ reduction in the $NO_X$ storage-reduction catalyst has substantially ended when the concentration of the $NO_X$ purifying component starts to rise so the injection control as well as the control to make the air-fuel ratio of the exhaust gas rich end. As a result, it is possible to suppress a deterioration in fuel efficiency and the like that can occur as a result of the control to make the air-fuel ratio of the exhaust gas rich.

In the foregoing structure, the injection controlling means may execute the injection such that an injection quantity in a later stage of the injection is less than the injection quantity in an initial stage of the injection. That is, the injection is executed in such a manner that the injection quantity during the initial stage of the injection is greater than the injection quantity during the later stage of the injection. The reason for this is as follows. During the initial stage of the control to make the air-fuel ratio of the exhaust rich, $NO_X$ that was stored in the $NO_X$ storage-reduction catalyst is released all at once, while almost no reducing agent is supplied to the $NO_X$ storage-reduction catalyst. Therefore, the injection quantity at that time is made relatively large. On the other hand, after a certain amount of time has passed after the control to make the air-fuel ratio of the exhaust rich has started, the reducing agent is supplied to the $NO_X$ storage-reduction catalyst so the injection quantity is reduced so that it is relatively small. Accordingly, it is possible to appropriately suppress both $NO_X$ and $NO_X$ purifying component from leaking out of the $NO_X$ storage-reduction catalyst.

A second aspect of the invention relates to an exhaust gas control method for an internal combustion engine having a three-way catalyst and a $NO_X$ storage-reduction catalyst downstream of the three-way catalyst in an exhaust passage. This exhaust gas control method includes performing control to make an air-fuel ratio of exhaust gas from a combustion chamber of the internal combustion engine rich to reduce $NO_X$ stored in the $NO_X$ storage-reduction catalyst, and performing control to ensure that a $NO_X$ purifying component capable of purifying the $NO_X$ is present in the $NO_X$ storage-reduction catalyst when reducing the $NO_X$.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein:

FIG. 1 is a schematic of the structure of a vehicle to which an exhaust gas control apparatus for an internal combustion engine according to a first example embodiment of the invention has been applied;

DETAILED DESCRIPTION OF THE EMBODIMENTS

Figure 2A:
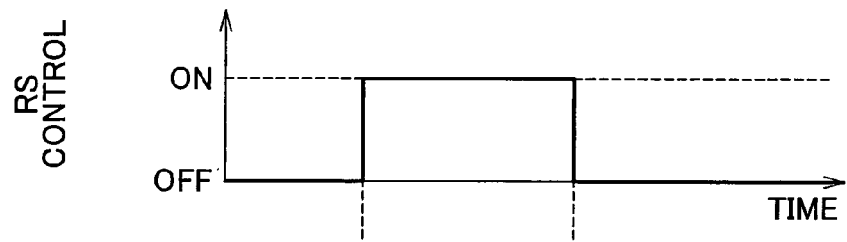
FIGS. 2A to 2D are graphs showing $NO_X$ leakage that may occur during the initial stage of RS control.

Hereinafter, first, second, and third example embodiments of the invention will be described with reference to the accompanying drawings.

First Example Embodiment

First, a first example embodiment of the invention will be described.

(Overall Structure)

FIG. 1 is a schematic of the structure of a vehicle 100 to which an exhaust gas apparatus for an internal combustion engine according to the first example embodiment of the invention has been applied. In the drawing, the solid arrows indicate the direction of gas flow, while the broken arrows indicate the direction of signal input and output.

The vehicle 100 is mainly provided with an intake passage 3, a throttle valve 6, a surge tank 7, an engine (i.e., an internal combustion engine) 8, a fuel injection valve 9, an exhaust passage 18, a three-way catalyst 21, a $NO_X$ storage-reduction catalyst 22, a urea injection valve 24, an $O_2$ sensor 25, a fuel tank 30, a urea water tank 31, and an ECU (Engine Control Unit) 50.

The intake passage 3 is a passage through which intake air to be supplied to the engine 8 flows. The throttle valve 6 which regulates the amount of intake air supplied to the engine 8 and the surge tank 7 which stores intake air to be supplied to the engine 8 are both provided in the intake passage 3. The engine 8 is supplied with intake air via the intake passage 3 and fuel which is injected by the fuel injection valve 9. More specifically, the intake air and fuel are supplied to a combustion chamber 8b of a cylinder 8a. In particular, the fuel, which is stored in the fuel tank 30, is supplied to the combustion chamber 8b by the fuel injection valve 9 via a fuel supply line 30a. The fuel injection valve 9 is controlled by a control signal supplied from the ECU 50.

Inside the combustion chamber 8b, a mixture of the intake air (i.e., air) and the fuel is ignited by a spark from a spark plug and combusted. The force generated by this combustion forces a piston 8c to move in a reciprocating motion which is transmitted to a crankshaft, not shown, via a connecting rod 8d so that the crankshaft rotates. Incidentally, although only one cylinder 8a is shown in FIG. 1 to facilitate the description, in actuality the engine may be configured to have two or more cylinders. Also, the engine 8 is not limited to being a direct injection type (in-cylinder type) engine in which fuel is injected directly into the combustion chamber 8b. Alternatively, the engine 8 may be a port injection type engine in which fuel is injected into the intake passage.

Moreover, an intake valve 10 and an exhaust valve 11 are provided in the combustion chamber 8b of the engine 8. The intake valve 10 is controlled open and closed to selectively allow and prevent communication between the intake passage 3 and the combustion chamber 8b. Similarly, the exhaust valve 11 is controlled open and closed to selectively allow and prevent communication between the exhaust passage 18 and the combustion chamber 8b.

The exhaust gas produced by combustion in the engine 8 is discharged into the exhaust passage 18 in which are provided, in order from upstream to downstream, the three-way catalyst 21, the urea injection valve 24, the $NO_X$ storage-reduction catalyst 22, and the $O_2$ sensor 25. The three-way sensor 21 is a catalyst having a precious metal such as platinum or rhodium as the active component and functions to remove oxides of nitrogen ($NO_X$), carbon monoxide (CO), and hydrocarbons (HC) and the like in the exhaust gas. The three-way catalyst 21 functions as a so-called start catalyst. The urea injection valve 24 is a valve that injects urea into the exhaust passage 18 between the three-way catalyst 21 and the $NO_X$ storage-reduction catalyst 22. The urea is stored in the urea water tank 31 and supplied into the exhaust passage 18 by the urea injection valve 24 via a urea supply line 31a. The urea injection valve 24 is controlled by a control signal supplied from the ECU 50.

The $NO_X$ storage-reduction catalyst 22 is a catalyst that serves to both store $NO_X$ in the exhaust gas and reduce the stored $NO_X$. More specifically, the $NO_X$ storage-reduction catalyst 22 basically stores $NO_X$ when the air-fuel ratio is lean and reduces the stored $NO_X$ using a reducing agent (such as $H_2$, CO, HC or the like) when the air-fuel ratio is rich or a stoichiometric air-fuel ratio. For example, when the $NO_X$ storage-reduction catalyst 22 is completely saturated with $NO_X$, the stored $NO_X$ is reduced by the ECU 50 executing rich spike control (i.e., RS control) that forcibly makes the air-fuel ratio rich. The $NO_X$ storage-reduction catalyst 22 functions as a so-called NSR ($NO_X$ Storage Reduction) catalyst. The $O_2$ sensor 25 is a sensor that detects the oxygen concentration downstream of the $NO_X$ storage-reduction catalyst 22. The oxygen concentration detected by the $O_2$ sensor 25 is supplied to the ECU 50 and used in air-fuel ratio control and the like, for example.

The ECU 50 includes a CPU, ROM, RAM, and an A/D converter and the like, none of which are shown. The ECU 50 performs various controls in the vehicle based on outputs supplied from various sensors in the vehicle. In the first example embodiment, the ECU 50 executes RS control to reduce $NO_X$ in the $NO_X$ storage-reduction catalyst 22. In addition, when performing this kind of RS control, the ECU 50 also performs control to ensure that a $NO_X$ purifying component which can purify $NO_X$ is present in the $NO_X$ storage-reduction catalyst 22. More specifically, the ECU 50 performs control to inject urea from the urea injection valve 24 into the exhaust passage 18 so that ammonia ($NH_3$), which is a $NO_X$ purifying component, is present in the $NO_X$ storage-reduction catalyst 22 (hereinafter this control may also be referred to as "urea injection control"). In this way, the ECU 50 functions as the rich controlling means and the controlling means (injection controlling means) of the invention.

(Control Method)

Figure 3A:
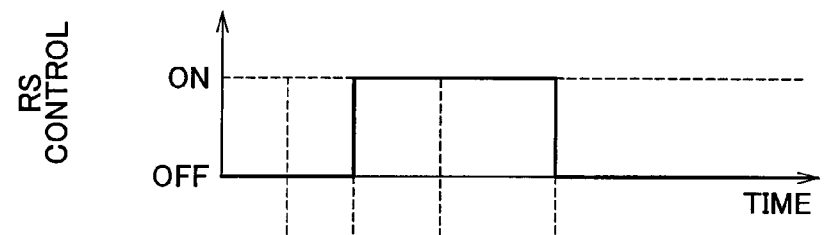
FIGS. 3A to 3E are graphs showing a control method according to the first example embodiment.
Figure 3B:
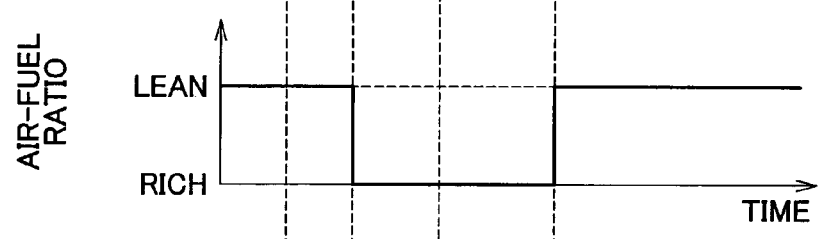
Figure 3C:
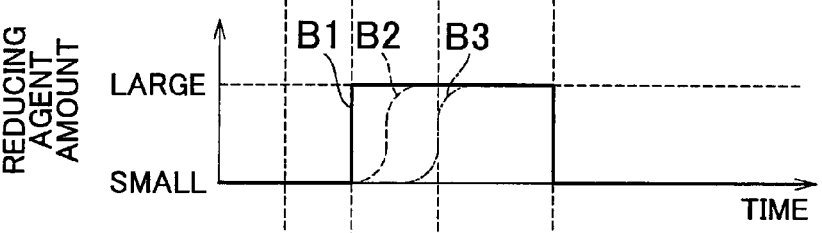
Figure 3D:
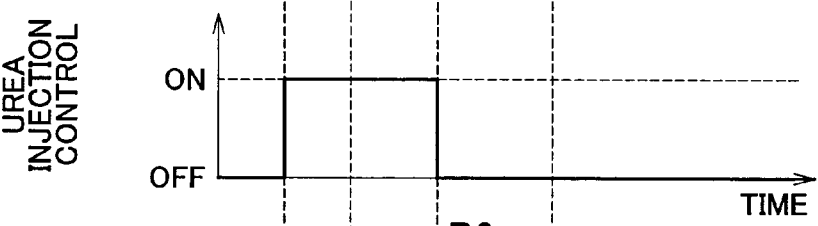
Figure 3E:
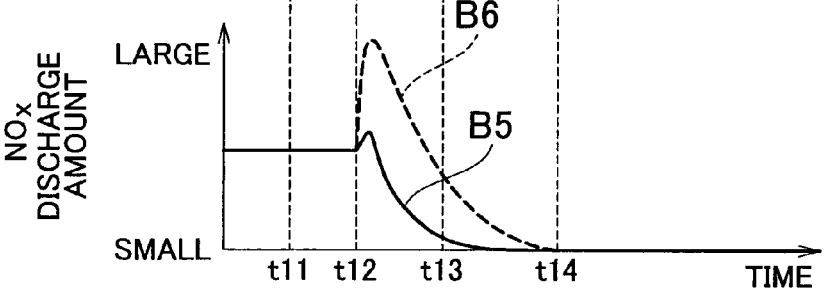
Figure 4:
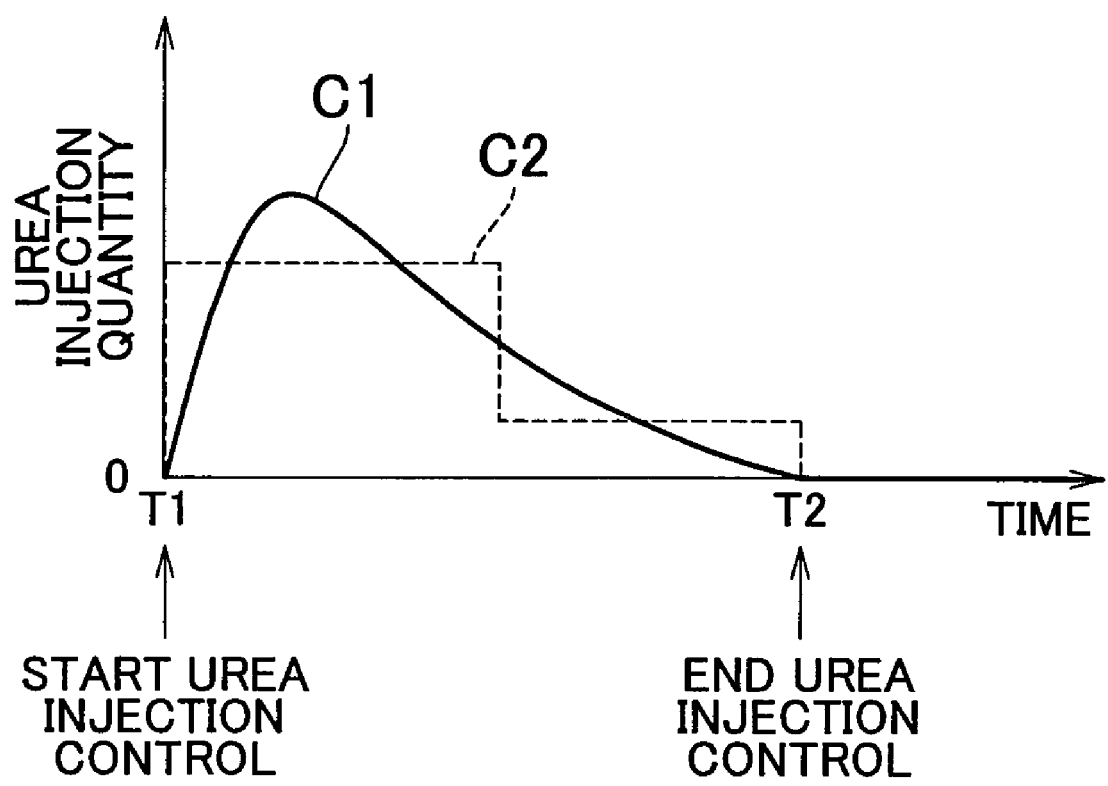
FIG. 4 is a graph showing one example of an amount of urea injected during urea injection control.

Here, a control method performed by the ECU 50 will be described in detail with reference to FIGS. 2 to 4. As described above, in the first example embodiment, the ECU 50 executes the urea injection control together with the RS control. More specifically, the ECU 50 starts the urea injection control before the RS control starts in order to suppress $NO_X$ leakage that may occur during the initial stage of the RS control. That is, $NO_X$ is purified (i.e., reduced to nitrogen which is harmless) by the ammonia which is produced from the urea by executing the urea injection control before the RS control.

Figure 2B:
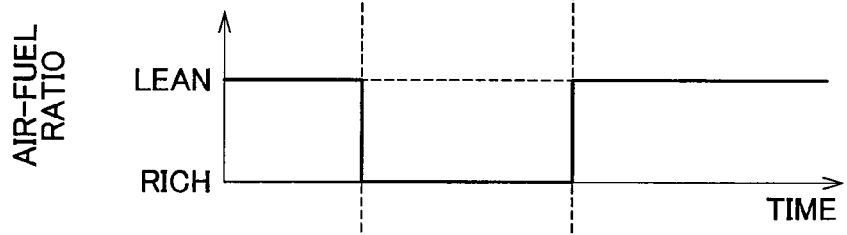
Figure 2C:
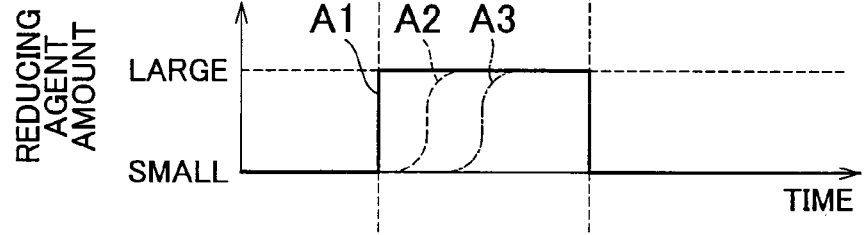
Figure 2D:
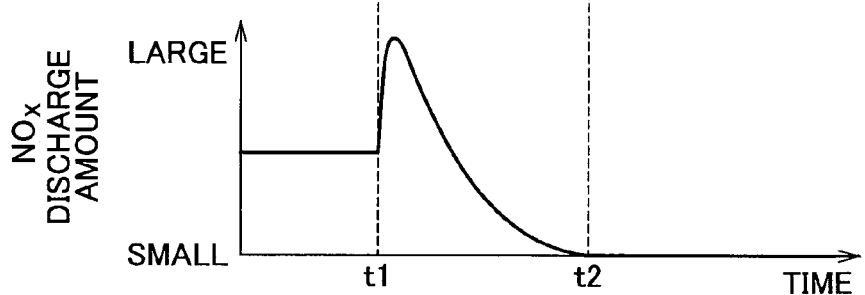

FIGS. 2A to 2D are views showing $NO_X$ leakage that may occur during the initial stage of the RS control. FIG. 2A shows the on/off state of the RS control, FIG. 2B shows the air-fuel ratio, FIG. 2C shows the amount of reducing agent, and FIG. 2D shows the amount of $NO_X$ discharged from the $NO_X$ storage-reduction catalyst 22 (hereinafter, this amount will simply be referred to as the "$NO_X$ discharge amount"). Also, the horizontal axis in each of FIGS. 2A to 2D represents time. Incidentally, in FIG. 2C, the solid line A1 basically shows the amount of reducing agent in the exhaust gas discharged from the engine 8 (i.e., the amount of reducing agent supplied to the three-way catalyst 21), the broken line A2 shows the amount of reducing agent in the exhaust gas discharged from the three-way catalyst 21, and the alternate long and short dash line A3 shows the amount of reducing agent supplied to the downstream end portion (i.e., the portion on the downstream side) of the $NO_X$ storage-reduction catalyst 22.

As shown in FIG. 2A, at time t1 a RS control request is output and the RS control starts. As a result, the air-fuel ratio changes from lean to rich, as shown in FIG. 2B. Also, as shown by the solid line A1 in FIG. 2C, the amount of reducing agent in the exhaust gas discharged from the engine 8 increases. Incidentally, the RS control is executed during the period from time t1 until time t2. When the RS control is executed in this manner, it is evident from FIG. 2D that $NO_X$ leaks out during the initial stage of the RS control.

Here, cause of this $NO_X$ leakage will be explained simply. When the air-fuel ratio is made rich by starting the RS control, $NO_X$ that was stored in the $NO_X$ storage-reduction catalyst 22 tends to be released from the catalyst surface. At this time, the gas exhausted from the engine 8 contains large amounts of reducing agents (see the solid line A1 in FIG. 2C). However, during the initial stage of the RS control, these reducing agents are consumed in the three-way catalyst 21, and as a result, almost none are supplied to the $NO_X$ storage-reduction catalyst 22 (see the broken line A2 and the alternate long and short dash line A3 in FIG. 2C). Therefore, as described above, the $NO_X$ released from the $NO_X$ storage-reduction catalyst 22 ends up being discharged as it is (see FIG. 2D). That is, $NO_X$ leakage occurs. Then when the oxygen and the like of the three-way catalyst 21 is gone, the reducing agents (in this specification, these reducing agents may also be referred to in the singular to simplify the description) are supplied to the $NO_X$ storage-reduction catalyst 22 and used to reduce oxygen and $NO_X$ in the $NO_X$ storage-reduction catalyst 22.

In the first example embodiment, both the RS control and the urea injection control are executed to appropriately suppress $NO_X$ leakage which may occur during the initial stage of the RS control. In this case, the $NO_X$ that leaks out during the initial stage of the RS control is purified by the ammonia produced by injecting urea. More specifically, the urea injection control starts to be executed a predetermined period of time before the reducing agent produced by the RS control reaches the $NO_X$ storage-reduction catalyst 22. More specifically, in the first example embodiment, the urea injection control starts before the RS control starts. Incidentally, The first predetermined period of time is set based on the timing at which the urea injection control should be started to ensure that there is ammonia in the $NO_X$ storage-reduction catalyst 22 before the reducing agent reaches the $NO_X$ storage-reduction catalyst 22.

Also in the first example embodiment, the urea injection control ends before the RS control ends to prevent ammonia from leaking out of the $NO_X$ storage-reduction catalyst 22. More specifically, the urea injection control ends a second predetermined period of time before the RS control ends. This second predetermined period of time is set based on the timing at which enough of the reducing agent to reduce $NO_X$ is supplied to the $NO_X$ storage-reduction catalyst 22. That is, the urea injection control ends when enough of the reducing agent to reduce the $NO_X$ in the $NO_X$ storage-reduction catalyst 22 is supplied to the $NO_X$ storage-reduction catalyst 22.

Furthermore, in the first example embodiment, the urea injection control is executed in such a manner that the amount of urea injected is less in the later stage of injection than it is in the initial stage of injection taking into account the release characteristics of $NO_X$ during the RS control described above. That is, during the initial stage of the RS control, $NO_X$ that was stored in the $NO_X$ storage-reduction catalyst 22 is released all at once, while almost no reducing agent is supplied to the $NO_X$ storage-reduction catalyst 22. Therefore, the amount of urea that is injected is relatively large at first. Then after a certain amount of time has passed after the RS control starts, the reducing agent is supplied to the $NO_X$ storage-reduction catalyst 22 so the amount of urea injected is reduced to a relatively small amount.

Here, the method for purifying $NO_X$ with ammonia will be described. First, ammonia ($NH_3$) is produced from urea (($NH_2)_2CO$) according to Reaction formula (1) below, for example. Incidentally, the reaction in Reaction formula (1) progresses appropriately at the temperature of the exhaust gas of a typical gasoline engine. That is, ammonia can be sufficiently produced in a typical gasoline engine.

$(NH_2)_2CO+H_2O \rightarrow 2NH_3+CO_2$   Reaction formula (1)

Then the NO and $NO_2$ in the exhaust gas are purified by the ammonia produced from Reaction formula (1). More specifically, NO and $NO_2$ are reduced to nitrogen ($N_2$) according to Reaction formulas (2) to (4) below.

$4NH_3+4NO+O_2 \rightarrow 4N_2+6H_2O$   Reaction formula (2)

$2NH_3+NO+NO_2 \rightarrow 2N_2+3H_2$   Reaction formula (3)

$4NH_3+2NO_2+O_2 \rightarrow 3N_2+6H_2O$   Reaction formula (4)

Incidentally, the temperature range for these reactions substantially matches the $NO_X$ purifying temperature range in the $NO_X$ storage-reduction catalyst 22. Therefore, it can be said that reducing $NO_X$ using ammonia is suitable for the $NO_X$ storage-reduction catalyst 22. Also, of Reaction formulas (2) to (4), the reaction rate of Reaction formula (3) is the fastest. That is, a ratio of $NO:NO_2=1:1$ is desirable to efficiently reduce $NO_X$. Although approximately 95% of the $NO_X$ in exhaust gas from a typical gasoline engine is NO, with the system structure in this example embodiment, the production of $NO_2$ progresses in the three-way catalyst 21 upstream of the $NO_X$ storage-reduction catalyst 22 so it is quite likely that the reaction in Reaction formula (3) will take place. That is, according to the system structure in this example embodiment, $NO_X$ can be reduced efficiently using ammonia.

Next, a control method according to the first example embodiment will be described more specifically with reference to FIGS. 3A to 3E. FIG. 3A shows the on/off state of the RS control, FIG. 3B shows the air-fuel ratio, FIG. 3C shows the amount of reducing agent, FIG. 3D shows the on/off state of the urea injection control, and FIG. 3E shows the amount of $NO_X$ discharged (i.e., the $NO_X$ discharge amount). Also, the horizontal axis in each of FIGS. 3A to 3E represents time. Incidentally, in FIG. 3C, the solid line B1 basically shows the amount of reducing agent in the exhaust gas discharged from the engine 8, the broken line B2 shows the amount of reducing agent in the exhaust gas discharged from the three-way catalyst 21, and the alternate long and short dash line B3 shows the amount of reducing agent supplied to the downstream end portion (i.e., the portion on the downstream side) of the $NO_X$ storage-reduction catalyst 22.

In this case, the urea injection control starts at time t11 (see FIG. 3D) before time t12 when the RS control starts. That is, the urea injection control starts earlier than the RS control does. Then the RS control starts (see FIGS. 3A and 3B) at time t12 after a certain amount of time has passed after the urea injection control started. The $NO_X$ discharge amount when the urea injection control is executed in this way is shown by the solid line B5 in FIG. 3E. In contrast, the broken line B6 in FIG. 3E shows the $NO_X$ discharge amount obtained when only the RS control is executed without the urea injection control being executed (this is the same as the graph in FIG. 2D). It is evident from the broken line B6 that there is $NO_X$ leakage in this case. When comparing the solid line B5 with the broken line B6, the $NO_X$ leakage is greatly suppressed by the execution of the urea injection control according to the first example embodiment. This substantial suppression of $NO_X$ leakage is thought to be because the $NO_X$ was purified by the ammonia produced from the urea.

Then at time t13 the urea injection control ends (see FIG. 3D). That is, the urea injection control ends before the RS control does. This is because at time t13 a sufficient amount of reducing agent is supplied to the downstream end portion of the $NO_X$ storage-reduction catalyst 22, as shown by the alternate long and short line B33 in FIG. 3C. Ending the urea injection control in this way makes it possible to prevent ammonia from leaking out. Then at time t14 after time t13, the RS control ends (see FIGS. 3A and 3B).

Next, an example of the amount of urea injected (i.e., the urea injection quantity) in the urea injection control will be described with reference to FIG. 4. In FIG. 4, the horizontal axis represents time and the vertical axis represents the urea injection quantity. In this case, the urea injection control starts at time T1 and ends at time T2. In the first example embodiment, the urea injection control is executed so that the urea injection quantity is less in the later stage of injection than it is in the initial stage of injection. In other words, the urea injection control is executed so that more urea is injected in the initial stage of injection than in the later stage of injection. The reason for this is as follows. In the initial stage of the RS control, almost no reducing agent is supplied to the $NO_X$ storage-reduction catalyst 22 so the amount of urea injected is made relatively large. On the other hand, after a certain amount of time has passed after the RS control starts, the reducing agent is supplied to the $NO_X$ storage-reduction catalyst 22 so the amount of urea injected is reduced to a relatively small amount. As a result, the urea injection control and the RS control enable $NO_X$ in the $NO_X$ storage-reduction catalyst 22 to be efficiently reduced while appropriately suppressing $NO_X$ and ammonia from leaking out. Incidentally, substantially the same effects as those described above can also be obtained when the urea injection control is executed according to the injection characteristics denoted by the broken line C2 in FIG. 4.

(Routine According to the First Example Embodiment)

Figure 5:
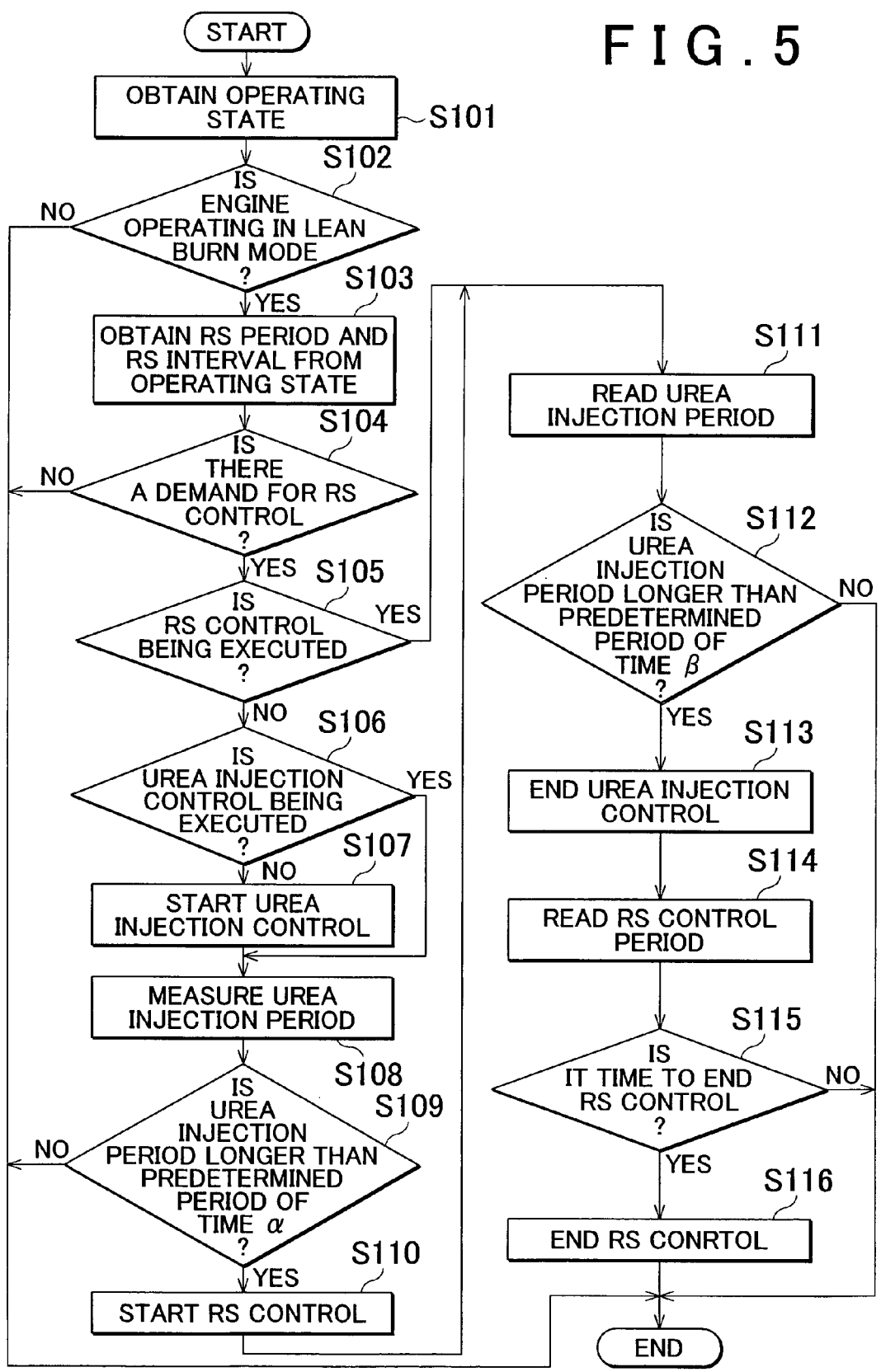
FIG. 5 is a flowchart illustrating a routine according to the first example embodiment.

Next, a routine according to the first example embodiment will be described with reference to the flowchart shown in FIG. 5. This routine is executed repeatedly at predetermined cycles by the ECU 50 described above.

First in step S101, the ECU 50 obtains the operating state of the engine 8, after which the process proceeds on to step S102. In step S102, the ECU 50 determines whether the engine 8 is operating in a lean burn mode. If the engine 8 is operating in the lean burn mode (i.e., Yes in step S102), the process proceeds on to step S103. If on the other hand, the engine 8 is not operating in the lean burn mode (i.e., No in step S104), the routine immediately ends.

In step S103, the ECU 50 obtains from the operating state the period of time for which the RS control is to be executed (hereinafter referred to as the "RS period") and the interval at which the RS control is to be executed (hereinafter referred to as the "RS interval"). Then the process proceeds on to step S104. In step S104, the ECU 50 determines whether there is a demand for the RS control. The ECU 50 determines whether the RS control should be executed based on, for example, the period of time that has passed after the RS control was executed last or the amount of $NO_X$ in the exhaust gas supplied to the $NO_X$ storage-reduction catalyst 22 or the like. If there is a demand for the RS control (i.e., Yes in step S104), the process proceeds on to step S105. If, on the other hand, there is not a demand for the RS control (i.e., No in step S104), the routine immediately ends.

In step S105, the ECU 50 determines whether the RS control is being executed. If the RS control is being executed (i.e., Yes in step S105), the process proceeds on to step S111. If, on the other hand, the RS control is not being executed (i.e., No in step S105), the process proceeds on to step S106. In step S106, the ECU 50 determines whether the urea injection control is being executed. If the urea injection control is being executed (i.e., Yes in step S106), the process proceeds on to step S108. If, on the other hand, the urea injection control is not being executed (i.e., No in step S106), the process proceeds on to step S107.

In step S107, the ECU 50 starts the urea injection control. In this case, there is a demand for the RS control and the urea injection control is not yet being executed so the ECU 50 starts the urea injection control. Then the process proceeds on to step S108. In step S108, the ECU 50 measures the period of time for which the urea injection control is executed (hereinafter referred to as the "urea injection period"). Then the process proceeds on to step S109.

In step S109, the ECU 50 determines whether the RS control can be executed without adverse effects resulting. More specifically, the ECU 50 determines whether the urea injection period obtained in step S108 has exceeded a predetermined period of time α. This predetermined period of time α corresponds to a period of time that should be allowed to pass after the urea injection control has started before starting the RS control to ensure that a $NO_X$ purifying component is present in the $NO_X$ storage-reduction catalyst 22 before the reducing agent from the RS control reaches the $NO_X$ storage-reduction catalyst 22. The predetermined period of time α is obtained from a map specified based on the operating conditions or from an operational expression based on the operating conditions or the like. Incidentally, the first predetermined period of time described above corresponds to a period of time which is equal to the sum of the period of time that it takes for the reducing agent to reach the $NO_X$ storage-reduction catalyst 22 after the RS control has started plus the predetermined period of time α.

If the urea injection period exceeds the predetermined period of time α (i.e., Yes in step S109), the process proceeds on to step S110. In this case, it may be said that the conditions are such that the RS control may be executed without adverse effects resulting. Accordingly, in step S110, the ECU 50 starts the RS control. Then the process proceeds to step S111. On the other hand, if the urea injection period has not exceeded the predetermined period of time α (i.e., No in step S109), the routine immediately ends. In this case, only the urea injection control is executed without starting the RS control.

In step S111, the ECU 50 reads the urea injection period. Then the process proceeds on to step S1112 where the ECU 50 determines whether there is a demand to end the urea injection control. In this case, the ECU 50 determines whether the urea injection period obtained in step S111 has exceeded a predetermined period of time β. The predetermined period of time β is set based on the timing at which enough of the reducing agent to reduce $NO_X$ is supplied to the $NO_X$ storage-reduction catalyst 22. More specifically, the predetermined period of time β is obtained from a map specified based on the operating conditions or from an operational expression based on the operating conditions or the like. Incidentally, the second predetermined period of time described above corresponds to a period of time which is equal to the difference of the period of time between the start of the urea injection control and end of the RS control minus the predetermined period of time β.

If the urea injection period exceeds the predetermined period of time β (i.e., Yes in step S112), the process proceeds on to step S113. In this case, it may be said that enough of the reducing agent to reduce $NO_X$ is being supplied to the $NO_X$ storage-reduction catalyst 22. Accordingly, in step S113, the ECU 50 ends the urea injection control. Then the process proceeds to step S114. On the other hand, if the urea injection period has not exceeded the predetermined period of time β (i.e., No in step S112), the routine immediately ends. In this case, the urea injection control continues to be executed.

In step S114, the ECU 50 reads the period of time for which the RS control is being executed (hereinafter referred to as the "RS control period"), after which the process proceeds on to step S115. In step S115, the ECU 50 determines whether it is time to end the RS control based on the RS control period obtained in step S114. More specifically, the ECU 50 determines whether the RS control period is longer than the RS period obtained in step S103.

If it is time to end the RS control (i.e., Yes in step S115), the process proceeds on to step S116. In step S116, the ECU 50 ends the RS control, after which the routine immediately ends. In contrast, if it is not time to end the RS control (i.e., No in step S115), the routine immediately ends. In this case, the RS control is continued.

According to the routine described above, $NO_X$ in the $NO_X$ storage-reduction catalyst 22 can be appropriately reduced while effectively suppressing $NO_X$ leakage by executing the RS control and the urea injection control. Furthermore, ammonia can also be appropriately prevented from leaking out which may otherwise occur due to the injection of urea.

Second Example Embodiment

Next, a second example embodiment of the invention will be described. In the foregoing first example embodiment, the urea injection control ends a second predetermined period of time before the RS control ends. That is, the urea injection control ends when enough of the reducing agent to reduce $NO_X$ is supplied to the $NO_X$ storage-reduction catalyst 22. However, in the second example embodiment, the urea injection control ends when the ammonia concentration (which corresponds to the $NO_X$ purifying component concentration) downstream of the $NO_X$ storage-reduction catalyst 22 starts to rise. In other words, in the second example embodiment, the urea injection control is ended taking into account not only the urea injection period but also the ammonia concentration. This is done to more reliably prevent ammonia from leaking out of the $NO_X$ storage-reduction catalyst 22.

Figure 6A:
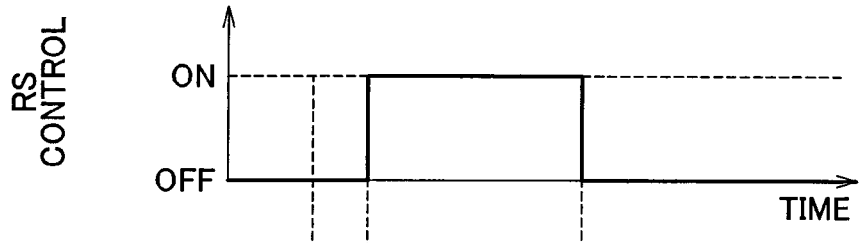
FIGS. 6A to 6D are graphs showing an ammonia leak from a $NO_X$ storage-reduction catalyst.

Here, ammonia leakage from the $NO_X$ storage-reduction catalyst 22 will be described with reference to FIGS. 6A to 6D. FIG. 6A shows the on/off state of the RS control, FIG. 6B shows the air-fuel ratio, FIG. 6C shows the on/off state of the urea injection control, and FIG. 6D shows the amount of ammonia discharged from the $NO_X$ storage-reduction catalyst 22 (hereinafter, also simply referred to as the "ammonia discharge amount").

Figure 6B:
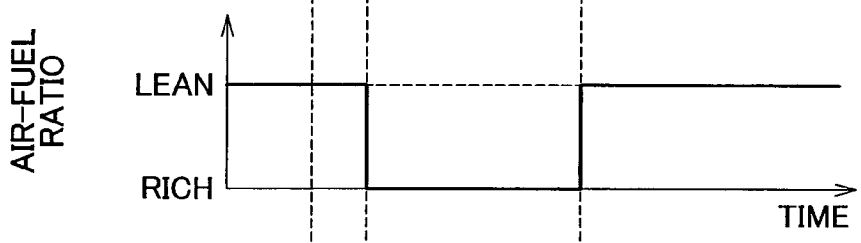
Figure 6C:
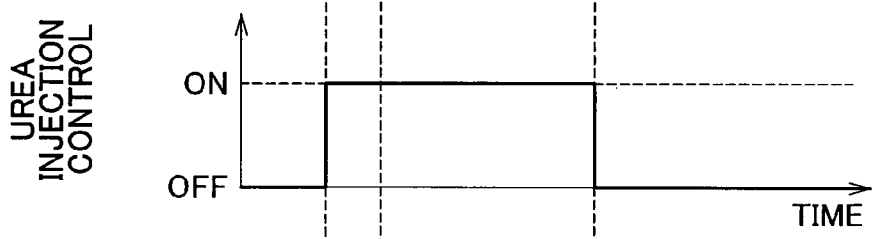
Figure 6D:
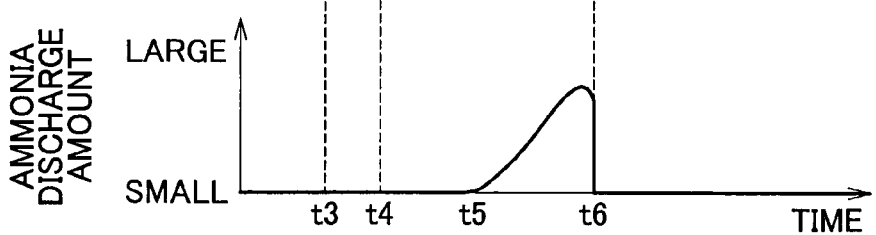

In this case, the urea injection control is executed from time t3 until time t6 (see FIG. 6C), and the RS control is executed from time t4 until time t6 (see FIGS. 6A and 6B). When the urea injection control is executed as shown in FIG. 6C, the ammonia discharge amount increases from time t5, as shown in FIG. 6D. This indicates that ammonia is leaking out of the $NO_X$ storage-reduction catalyst 22. This kind of phenomenon is thought to occur because the urea injection control continues to be executed even though $NO_X$ reduction in the $NO_X$ storage-reduction catalyst 22 has substantially ended. That is, it is thought that ammonia is discharged without being used to reduce $NO_X$ because the urea continues to be injected even though there is almost no NO or $NO_2$ present to be reduced using the ammonia. Accordingly, in the second example embodiment, the urea injection control ends when the ammonia concentration downstream of the $NO_X$ storage-reduction catalyst 22 starts to increase.

Figure 8:
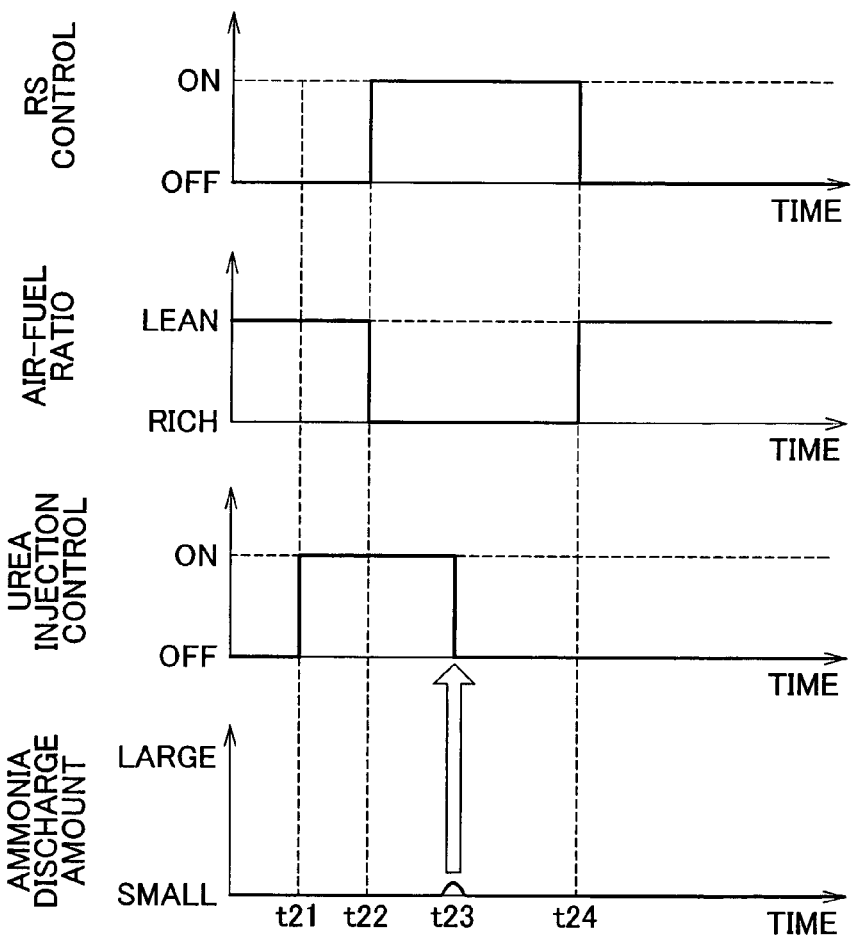
FIGS. 8A to 8D are graphs showing a control method according to the second example embodiment.
Figure 9:
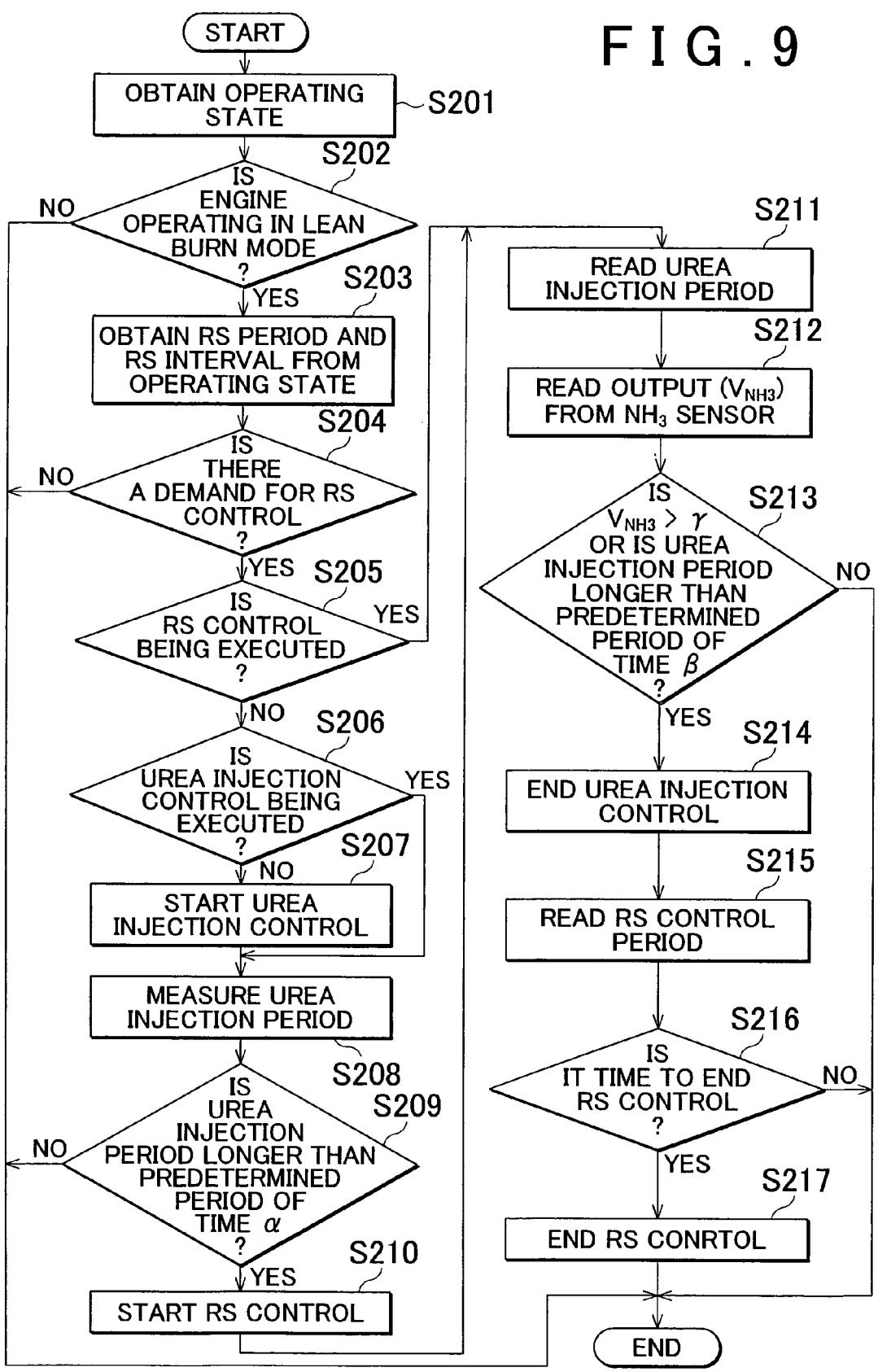
FIG. 9 is a flowchart illustrating a routine according to the second example embodiment.

Hereinafter, the second example embodiment of the invention will be described in more detail with reference to FIGS. 7 to 9.

Figure 7:
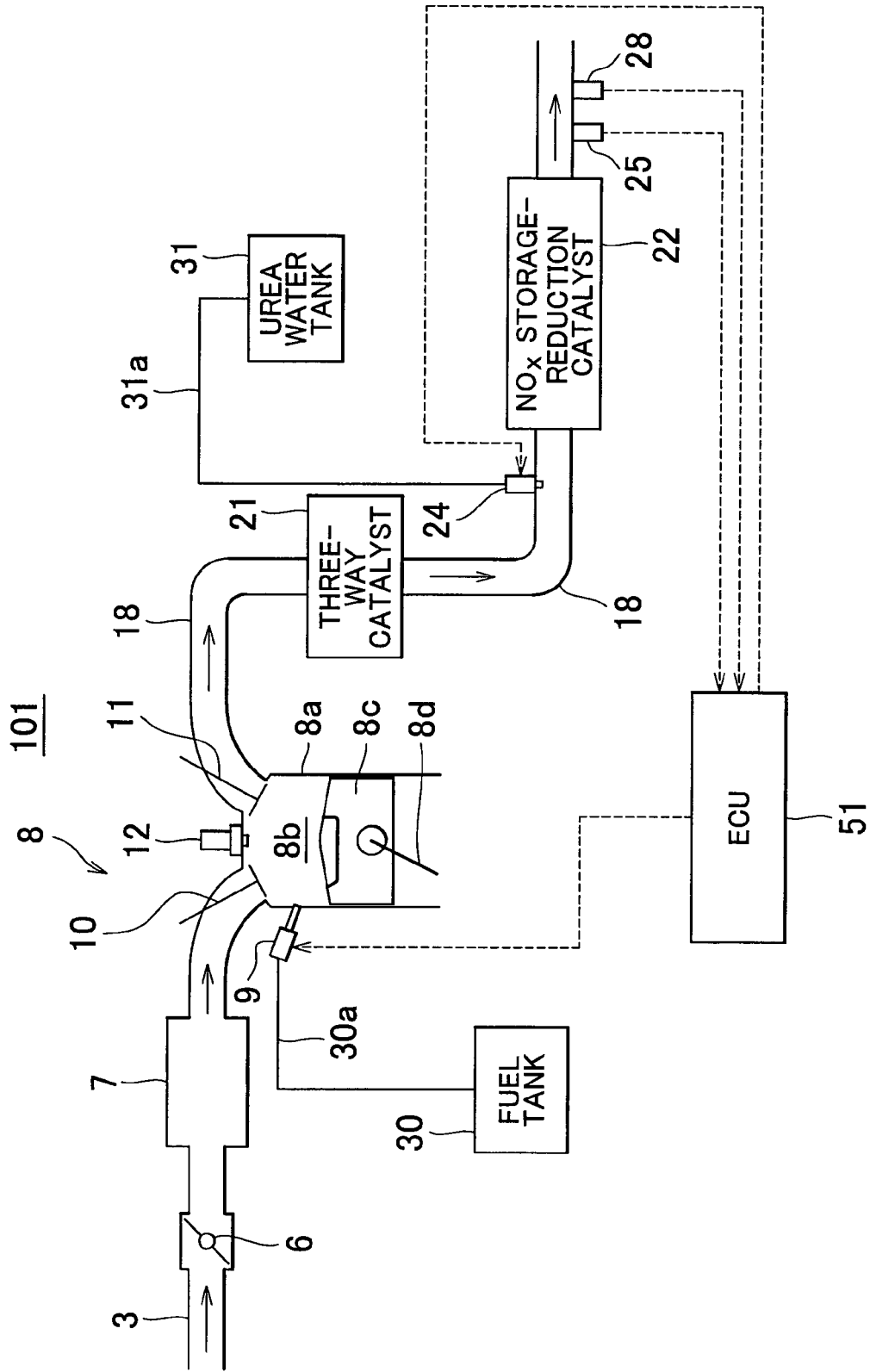
FIG. 7 is a schematic of the structure of a vehicle to which an exhaust gas control apparatus for an internal combustion engine according to a second example embodiment of the invention has been applied.

FIG. 7 is a schematic of the structure of a vehicle 101 to which an exhaust gas control apparatus for an internal combustion engine according to the second example embodiment of the invention has been applied. Here, constituent elements that are the same as those of the vehicle 100 described above (see FIG. 1) will be denoted by like reference numerals and descriptions of those elements will be omitted. Incidentally, in FIG. 7, the solid arrows indicate the direction of gas flow, while the broken arrows indicate the direction of signal input and output.

The vehicle 101 has a $NH_3$ sensor 28 downstream of the $NO_X$ storage-reduction catalyst 22 in the exhaust passage 18. This $NH_3$ sensor 28 is a sensor that detects the ammonia concentration and supplies a detection signal indicative of the detected ammonia concentration to an ECU 51. Incidentally, a $NO_X$ sensor may be used instead of the $NH_3$ sensor 28 because $NO_X$ sensors can also detect the ammonia concentration.

The ECU 51 includes a CPU, ROM, RAM, and an A/D converter and the like, none of which are shown. The ECU 51 functions as rich controlling means and controlling means (i.e., injection controlling means) and executes RS control and urea injection control, similar to the ECU 50 described above. In particular, the ECU 51 ends the urea injection control based on the ammonia concentration obtained from the $NH_3$ sensor 28. More specifically, the ECU 51 ends the urea injection control when the ammonia concentration starts to rise.

Next, a control method according to the second example embodiment will be described in detail with reference to FIGS. 8A to 8D. FIG. 8A shows the on/off state of the RS control, FIG. 8B shows the air-fuel ratio, FIG. 8C shows the on/off state of the urea injection control, and FIG. 8D shows the ammonia discharge amount.

In this example embodiment, the urea injection control starts from time t21 (see FIG. 8C) and the RS control starts from time t22 (see FIGS. 8A and 8B). When the urea injection control is executed as shown in FIG. 8C, the ammonia discharge amount starts to increase at time t23, as is shown in FIG. 8D. In the second example embodiment, the urea injection control ends when the ammonia discharge amount starts to increase in this manner, as shown in FIG. 8C. As a result, the ammonia discharge amount becomes substantially 0 after time t23, as shown in FIG. 8D. This indicates that leakage of ammonia from the $NO_X$ storage-reduction catalyst 22 is being suppressed.

Next, a routine according to the second example embodiment will be described with reference to the flowchart shown in FIG. 9. This routine is repeatedly executed at predetermined cycles by the ECU 51 described above. Incidentally steps S201 to S211 shown in FIG. 9 are the same as steps S101 to S111 shown in FIG. 6 so a description of these steps will be omitted. Here, the steps from step S212 on in this routine will be described.

In step S212, the ECU 51 reads the output (referred to as "$V_{NH3}$") from the $NH_3$ sensor 28. $V_{NH3}$ corresponds to the ammonia concentration in the exhaust passage 18 downstream of the $NO_X$ storage-reduction catalyst 22. When this step ends, the process proceeds on to step S213.

In step S213, the ECU 51 determines whether there is a demand to end the urea injection control. In this case, the ECU 51 determines whether $V_{NH3}$ is greater than a predetermined value γ or whether the urea injection period has exceeded the predetermined period of time β. That is, the ECU 51 determines whether the urea injection control should be ended by determining whether the ammonia concentration is starting to rise and determining whether enough of the reducing agent to reduce $NO_X$ is being supplied to the $NO_X$ storage-reduction catalyst 22. Incidentally, the predetermined period of time β is set according to the method described above.

If $V_{NH3}$ is greater than the predetermined value γ or the urea injection period exceeds the predetermined period of time β (i.e., Yes in step S213), the process proceeds on to step S214. In this case, it may be said that ammonia is starting to leak from the $NO_X$ storage-reduction catalyst 22 or there is enough of the reducing agent to reduce $NO_X$ being supplied to the $NO_X$ storage-reduction catalyst 22. Therefore, in step S214 the ECU 51 ends the urea injection control and the process proceeds on to step S215. On the other hand, if $V_{NH3}$ is equal to or less than the predetermined value γ and the urea injection period has not exceeded the predetermined period of time β (i.e., No in step S213), the routine immediately ends. In this case, the urea injection control is continued.

In step S215, the ECU 51 reads the RS control period, after which the process proceeds on to step S216. In step S216 the ECU 51 determines whether it is time to end the RS control based on the RS control period obtained in step S215. More specifically, the ECU 51 determines whether the RS control period has exceeded the RS period obtained in step S203.

If it is time to end the RS control (i.e., Yes in step S216), the process proceeds on to step S217. In step S217, the ECU 51 ends the RS control, after which the routine immediately ends. If, on the other hand, it is not time to end the RS control (i.e., No in step S216), the routine immediately ends. In this case, the RS control is continued.

With the routine according to the second example embodiment described above, the urea injection control ends when the ammonia concentration starts to rise so it is possible to more reliably prevent ammonia from leaking out of the $NO_X$ storage-reduction catalyst 22.

Third Example Embodiment

Next, a third example embodiment of the invention will be described. In the foregoing second example embodiment, only the urea injection control ends when the ammonia concentration downstream of the $NO_X$ storage-reduction catalyst 22 starts to rise. However, in the third example embodiment, the RS control as well as the urea injection control ends when the ammonia concentration starts to rise. This is because it is conceivable that $NO_X$ reduction in the $NO_X$ storage-reduction catalyst 22 has substantially ended when the ammonia concentration starts to rise so it is not necessary to execute the RS control or the urea injection control. That is, it is not necessary to continue to supply the reducing agent according to the RS control.

Figure 10A:
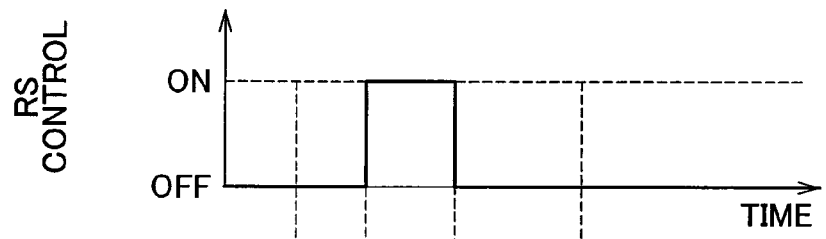
FIGS. 10A to 10E are graphs showing a control method according to a third example embodiment of the invention.

Here, a control method according to the third example embodiment will be described in detail with reference to FIGS. 10A to 10E. FIG. 10A shows the on/off state of the RS control, FIG. 10B shows the air-fuel ratio, FIG. 10C shows the fuel injection quantity, FIG. 10D shows the on/off state of the urea injection control, and FIG. 10E shows the ammonia discharge amount.

Figure 10B:
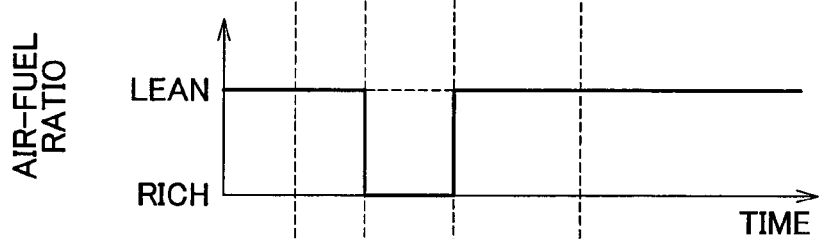
Figure 10C:
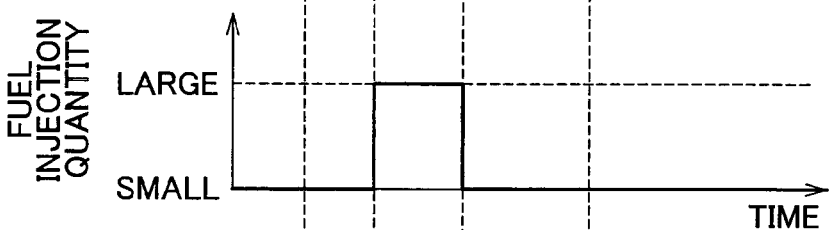
Figure 10D:
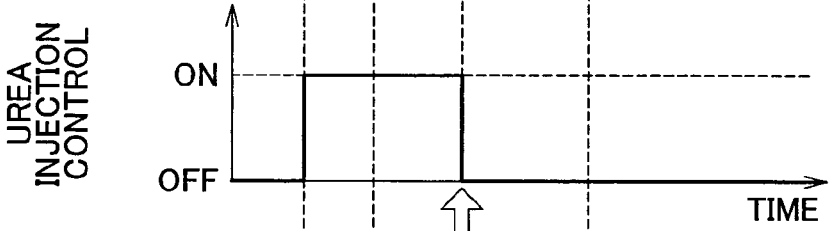
Figure 10E:
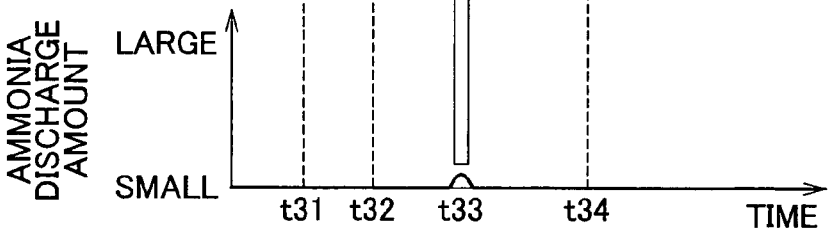

In this example embodiment, the urea injection control starts from time t31 (see FIG. 10D) and the RS control starts from time t32 (see FIGS. 10A to 10C). When the urea injection control is executed as shown in FIG. 10D, the ammonia discharge amount starts to rise at time t33, as is shown in FIG. 10E. In the third example embodiment, the urea injection control ends when the ammonia discharge amount starts to increase in this manner, as shown in FIG. 10D. As a result, the ammonia discharge amount becomes substantially 0 after time t33, as shown in FIG. 10E. Furthermore, in the third example embodiment, the RS control ends, as shown in FIGS. 10A to 10C, when the ammonia discharge amount starts to rise (time t33). In this case, the $NO_X$ reduction in the $NO_X$ storage-reduction catalyst 22 has ended so it is not necessary to supply the reducing agent according to the RS control, thus the RS control ends.

Figure 11:
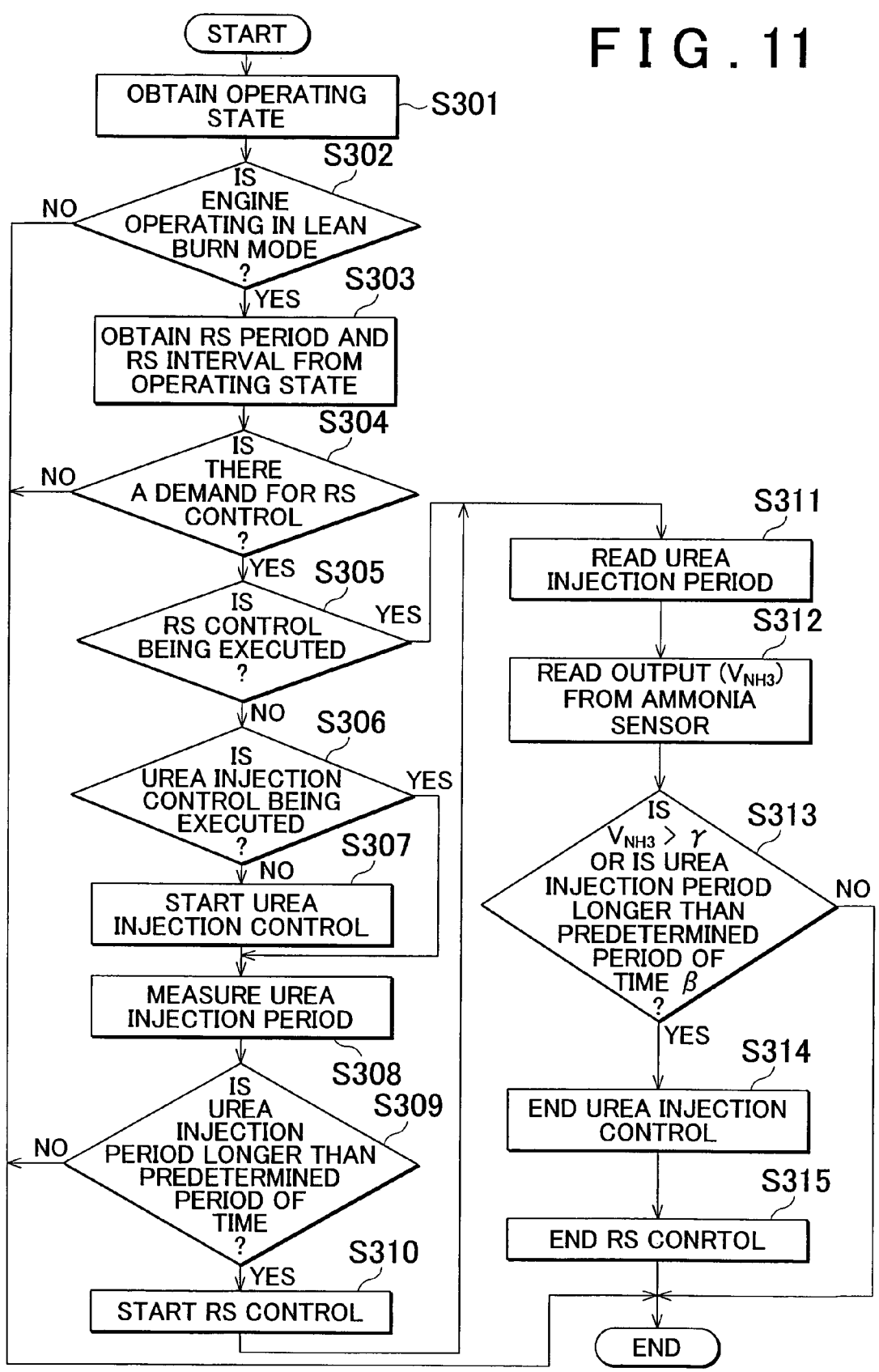
FIG. 11 is a flowchart illustrating a routine according to the third example embodiment.

Next, a routine according to the third example embodiment will be described with reference to the flowchart in FIG. 11. This routine is repeatedly executed at predetermined cycles by the ECU 51 described above (see FIG. 7). Incidentally, steps S301 to S313 shown in FIG. 11 are the same as steps S201 to S213 shown in FIG. 9 so descriptions thereof will be omitted. Here, the steps from step S314 on in this routine will be described.

Step S314 is executed when $V_{NH3}$ is greater than the predetermined value γ or the urea injection period has exceeded the predetermined period of time β (i.e., Yes in step S313). In this case, it may be said that the conditions are such that the urea injection control should be ended. Accordingly, in step S314, the ECU 51 ends the urea injection control. Then the process proceeds to step S315.

In step S315, the ECU 51 ends the RS control. In this case, $NO_X$ reduction in the $NO_X$ storage-reduction catalyst 22 has substantially ended so it is no longer necessary to execute the RS control. Accordingly, the RS control ends immediately after the urea injection control ends. After this step has ended, the routine ends.

With the foregoing routine according to the third example embodiment, the RS control is ended when the ammonia concentration starts to rise, which makes it possible to suppress a deterioration in fuel efficiency and the like due to the RS control.

Modified Example

Heretofore, example embodiments have been described in which control for injecting urea (i.e., urea injection control) is performed to ensure that a $NO_X$ purifying component (i.e., ammonia) capable of purifying $NO_X$ is present in the $NO_X$ storage-reduction catalyst 22. However, the invention is not limited to this. In another example, it is possible to perform control for injecting one or more of urea, ammonia, and fuel (HC) instead of injecting only urea. In this case as well, it is possible to ensure that an appropriate amount of $NO_X$ purifying component is present in the $NO_X$ storage-reduction catalyst 22.

Also, in the example embodiments described above, both urea injection control and RS control are executed to reduce $NO_X$ in the $NO_X$ storage-reduction catalyst 22. However, the invention is not limited to this. In another example, only the urea injection control can be executed without executing the RS control in order to reduce $NO_X$ in the $NO_X$ storage-reduction catalyst 22. In this case, it is possible to suppress torque shock (in particular, shock that may occur due to a torque step which is caused by a difference in output when the air-fuel ratio changes from lean to rich or from rich to lean) and the like caused by the RS control.

Furthermore, in the example embodiments described above, the urea injection control starts before the RS control starts. However, the invention is not limited to this. That is, as long as ammonia is present in the $NO_X$ storage-reduction catalyst 22 before the reducing agent reaches the $NO_X$ storage-reduction catalyst 22, the urea injection control does not have to be started before the RS control is started. For example, the urea injection control can be executed at the same time as or after the RS control is started when ammonia is already present in the $NO_X$ storage-reduction catalyst 22.

While the invention has been described with reference to example embodiments thereof, it is to be understood that the invention is not limited to the example embodiments or constructions. To the contrary, the invention is intended to cover various modifications and equivalent arrangements. In addition, while the various elements of the example embodiments are shown in various combinations and configurations, which are exemplary, other combinations and configurations, including more, less or only a single element, are also within the spirit and scope of the invention.

The invention claimed is:

1. An exhaust gas control apparatus for an internal combustion engine, comprising:
    a three-way catalyst provided in an exhaust passage;
    a $NO_X$ storage-reduction catalyst provided in the exhaust passage downstream of the three-way catalyst;
    a rich controlling device that performs control to make an air-fuel ratio of exhaust gas from a combustion chamber of the internal combustion engine rich to reduce $NO_X$ stored in the $NO_X$ storage-reduction catalyst; and
    a control device that performs control to ensure that a $NO_X$ purifying component purifying the $NO_X$ is present in the $NO_X$ storage-reduction catalyst when reducing the $NO_X$,
    the control device including an injection controlling device that injects at least one of urea, ammonia, or fuel into the exhaust passage to ensure that the $NO_X$ purifying component is present in the $NO_X$ storage-reduction catalyst, and
    the injection controlling device starts the injection a first predetermined period of time before a reducing agent produced by making the air-fuel ratio rich reaches the $NO_X$ storage-reduction catalyst.

2. The exhaust gas control apparatus according to claim 1, wherein the $NO_X$ purifying component is ammonia.

3. The exhaust gas control apparatus according to claim 1, wherein the first predetermined period of time is set based on a timing at which the injection should be started to ensure that the $NO_X$ purifying component is present in the $NO_X$ storage-reduction catalyst before the reducing agent reaches the $NO_X$ storage-reduction catalyst.

4. The exhaust gas control apparatus according to claim 1, wherein the injection controlling device ends the injection a second predetermined period of time before the control by the rich controlling device ends.

5. The exhaust gas control apparatus according to claim 4, wherein the second predetermined period of time is set based on a timing at which enough of the reducing agent, which is produced by making the air-fuel ratio rich, to reduce the $NO_X$ is supplied to the $NO_X$ storage-reduction catalyst.

6. The exhaust gas control apparatus according to claim 1, further comprising:
a $NO_X$ purifying component concentration obtaining device that obtains a concentration of the $NO_X$ purifying component in the exhaust gas downstream of the $NO_X$ storage-reduction catalyst,
wherein the injection controlling device ends the injection when the concentration of the $NO_X$ purifying component starts to rise.

7. The exhaust gas control apparatus according to claim 6, wherein the rich controlling device ends the control to make the air-fuel ratio of the exhaust gas rich when the injection controlling device ends the injection.

8. The exhaust gas control apparatus according to claim 1, wherein the injection controlling device executes the injection such that an injection quantity in a later stage of the injection is less than the injection quantity in an initial stage of the injection.

9. The exhaust gas control apparatus according to claim 1, wherein the injection controlling device injects the at least one of urea, ammonia, or fuel into the exhaust passage upstream of the $NO_X$ storage-reduction catalyst.

10. An exhaust gas control method for an internal combustion engine including a three-way catalyst and a $NO_X$ storage-reduction catalyst downstream of the three-way catalyst in an exhaust passage, comprising:
performing control to make an air-fuel ratio of exhaust gas from a combustion chamber of the internal combustion engine rich to reduce $NO_X$ stored in the $NO_X$ storage-reduction catalyst; and
performing control to ensure that a $NO_X$ purifying component purifying the $NO_X$ is present in the $NO_X$ storage-reduction catalyst when reducing the $NO_X$ by injecting one or more $NO_X$ purifying components from among urea, ammonia, or fuel into the exhaust passage, and
the injection is started a first predetermined period of time before a reducing agent produced by making the air-fuel ratio rich reaches the $NO_X$ storage-reduction catalyst.

11. The exhaust gas control method according to claim 10, wherein the $NO_X$ purifying component is ammonia.

12. The exhaust gas control method according to claim 10, wherein the first predetermined period of time is set based on a timing at which the injection should be started to ensure that the $NO_X$ purifying component is present in the $NO_X$ storage-reduction catalyst before the reducing agent reaches the $NO_X$ storage-reduction catalyst.

13. The exhaust gas control method according to claim 10, wherein the injection ends a second predetermined period of time before the control to make the air-fuel ratio of the exhaust gas rich ends.

14. The exhaust gas control method according to claim 13, wherein the second predetermined period of time is set based on a timing at which enough of the reducing agent, which is produced by making the air-fuel ratio rich, to reduce the $NO_X$ is supplied to the $NO_X$ storage-reduction catalyst.

15. The exhaust gas control method according to claim 10, wherein the internal combustion engine includes $NO_X$ purifying component concentration obtaining device that obtains a concentration of the $NO_X$ purifying component in the exhaust gas downstream of the $NO_X$ storage-reduction catalyst and the injection ends when the concentration of the $NO_X$ purifying component starts to rise.

16. The exhaust gas control method according to claim 15, wherein the control to make the air-fuel ratio of the exhaust gas rich ends when the injection ends.

17. The exhaust gas control method according to claim 10, wherein the injection is executed such that an injection quantity in a later stage of the injection is less than the injection quantity in an initial stage of the injection.

* * * * *